US008526977B2

(12) United States Patent
Pearson et al.

(10) Patent No.: US 8,526,977 B2
(45) Date of Patent: Sep. 3, 2013

(54) LOCATION BASED CALL ROUTING FOR CALL ANSWERING SERVICES

(75) Inventors: Larry B. Pearson, San Antonio, TX (US); J. Bradley Bridges, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 891 days.

(21) Appl. No.: 10/668,686

(22) Filed: Sep. 23, 2003

(65) Prior Publication Data
US 2005/0063528 A1    Mar. 24, 2005

(51) Int. Cl.
*H04W 4/00* (2009.01)
*H04W 24/00* (2009.01)

(52) U.S. Cl.
USPC ............ 455/461; 455/456.1; 455/435.1; 455/426.1

(58) Field of Classification Search
USPC ............ 455/90.1, 456.1–456.6, 461, 426.1, 455/426.2, 435.1
See application file for complete search history.

(56) References Cited

U.S. PATENT DOCUMENTS

| | | | |
|---|---|---|---|
| 4,275,385 A * | 6/1981 | White | 340/825.49 |
| 4,752,951 A * | 6/1988 | Konneker | 379/201.07 |
| 4,932,050 A * | 6/1990 | Davidson et al. | 379/211.02 |
| 4,935,927 A | 6/1990 | Kaewell, Jr. et al. | |
| 4,989,230 A | 1/1991 | Gillig et al. | |
| 5,127,042 A | 6/1992 | Gillig et al. | |
| 5,142,695 A | 8/1992 | Roberts et al. | |
| 5,155,759 A | 10/1992 | Saegusa et al. | |
| 5,218,716 A | 6/1993 | Comroe et al. | |
| 5,229,701 A | 7/1993 | Leman et al. | |
| 5,247,567 A | 9/1993 | Hirano | |
| 5,260,988 A | 11/1993 | Schellinger et al. | |
| 5,353,331 A | 10/1994 | Emery et al. | |
| 5,367,558 A | 11/1994 | Gillig et al. | |
| 5,375,161 A | 12/1994 | Fuller et al. | |

(Continued)

FOREIGN PATENT DOCUMENTS

| | | |
|---|---|---|
| EP | 0 671859 | 9/1995 |
| EP | 0 713345 | 5/1996 |

(Continued)

OTHER PUBLICATIONS

Verb Exchange Service—Tagline—One number gets me everywhere; www.verbx.com/srv/service_tagline.html; 1 page, May 16, 2003.

(Continued)

*Primary Examiner* — Matthew Sams
(74) *Attorney, Agent, or Firm* — Toler Law Group, PC

(57) ABSTRACT

In one particular embodiment, the disclosure is directed to a method of processing a call. The method includes receiving location data, storing the location data in a data record, receiving a first call, playing an announcement, prompting for a caller's name, receiving the caller's name, and retrieving the data record. The location data is received via an interconnected network. The location data is derived from a proximity sensor that is configured to provide a proximity determination with respect to a mobile device of a subscriber and the proximity sensor. The first call is received at a primary destination address associated with the subscriber. The data record is retrieved to identify a selected address that identifies a communication device of the subscriber. The communication device is located within a proximity zone proximate to the proximity sensor.

17 Claims, 7 Drawing Sheets

(56) References Cited

U.S. PATENT DOCUMENTS

| | | |
|---|---|---|
| 5,442,680 A | 8/1995 | Schellinger et al. |
| 5,469,496 A | 11/1995 | Emery et al. |
| 5,515,366 A | 5/1996 | Chieu et al. |
| 5,550,895 A | 8/1996 | Burson et al. |
| 5,553,117 A | 9/1996 | Peterson et al. |
| 5,603,054 A * | 2/1997 | Theimer et al. .................. 710/6 |
| 5,636,243 A | 6/1997 | Tanaka |
| 5,644,620 A | 7/1997 | Shimura |
| 5,673,308 A | 9/1997 | Akhavan |
| 5,745,850 A | 4/1998 | Aldermeshian et al. |
| 5,748,147 A | 5/1998 | Bickley et al. |
| 5,842,112 A | 11/1998 | Fuller et al. |
| 5,950,133 A | 9/1999 | Bledsoe |
| 5,995,839 A | 11/1999 | Coursey et al. |
| 6,041,229 A | 3/2000 | Turner |
| 6,069,588 A | 5/2000 | O'Neill, Jr. |
| 6,073,031 A | 6/2000 | Helstab et al. |
| 6,091,949 A | 7/2000 | Sanchez |
| 6,130,938 A | 10/2000 | Erb |
| 6,185,427 B1 | 2/2001 | Krasner et al. |
| 6,188,888 B1 | 2/2001 | Bartle et al. |
| 6,201,950 B1 | 3/2001 | Fuller et al. |
| 6,208,854 B1 | 3/2001 | Roberts et al. |
| 6,240,297 B1 | 5/2001 | Jadoul |
| 6,301,350 B1 | 10/2001 | Henningson et al. |
| 6,320,534 B1 * | 11/2001 | Goss .......................... 342/357.1 |
| 6,332,082 B1 | 12/2001 | Fuller et al. |
| 6,362,778 B2 * | 3/2002 | Neher ....................... 342/357.07 |
| 6,373,817 B1 | 4/2002 | Kung et al. |
| 6,389,117 B1 * | 5/2002 | Gross et al. ................. 379/88.23 |
| 6,424,840 B1 | 7/2002 | Fitch et al. |
| 6,480,593 B1 | 11/2002 | Munday et al. |
| 6,484,027 B1 | 11/2002 | Mauney et al. |
| 6,505,055 B1 | 1/2003 | Kahn et al. |
| 6,516,060 B1 | 2/2003 | Foladare et al. |
| 6,574,213 B1 | 6/2003 | Anandakumar et al. |
| 6,574,470 B1 | 6/2003 | Chow et al. |
| 6,587,475 B1 | 7/2003 | Przygienda |
| 6,587,683 B1 | 7/2003 | Chow et al. |
| 6,600,734 B1 | 7/2003 | Gernert et al. |
| 6,611,681 B2 | 8/2003 | Henderson |
| 6,614,206 B1 | 9/2003 | Wong et al. |
| 6,614,784 B1 | 9/2003 | Glitho et al. |
| 6,625,423 B1 | 9/2003 | Wang |
| 6,650,088 B1 | 11/2003 | Webb et al. |
| 6,704,580 B1 | 3/2004 | Fintel |
| 6,735,432 B1 | 5/2004 | Jarett et al. |
| 6,766,175 B2 | 7/2004 | Uchiyama |
| 6,856,806 B1 | 2/2005 | Bosik et al. |
| 6,892,083 B2 | 5/2005 | Shostak |
| 6,978,154 B1 | 12/2005 | Ospalak et al. |
| 6,978,163 B2 | 12/2005 | Dyer et al. |
| 7,006,833 B1 * | 2/2006 | Contractor ................. 455/456.1 |
| 7,031,698 B1 * | 4/2006 | Appelman ..................... 455/417 |
| 7,656,860 B2 * | 2/2010 | Phillips et al. ................. 370/352 |
| 2001/0014599 A1 | 8/2001 | Henderson |
| 2001/0019955 A1 | 9/2001 | Henderson |
| 2002/0000930 A1 * | 1/2002 | Crowson et al. ............. 342/357.1 |
| 2002/0029258 A1 * | 3/2002 | Mousseau et al. ............ 709/218 |
| 2002/0102968 A1 * | 8/2002 | Arend et al. .................. 455/414 |
| 2002/0111190 A1 | 8/2002 | Harrison et al. |
| 2002/0113879 A1 * | 8/2002 | Battle et al. ................. 348/207.2 |
| 2002/0115480 A1 | 8/2002 | Huang |
| 2002/0119800 A1 | 8/2002 | Jaggers et al. |
| 2002/0137472 A1 | 9/2002 | Quinn et al. |
| 2002/0165988 A1 * | 11/2002 | Khan et al. .................... 709/246 |
| 2002/0181442 A1 | 12/2002 | Rajani |
| 2003/0003900 A1 | 1/2003 | Goss et al. |
| 2003/0039242 A1 | 2/2003 | Moore, Jr. |
| 2003/0064732 A1 * | 4/2003 | McDowell et al. ........... 455/456 |
| 2003/0092451 A1 | 5/2003 | Holloway et al. |
| 2003/0125075 A1 | 7/2003 | Klovborg |
| 2003/0133421 A1 | 7/2003 | Sundar et al. |
| 2003/0161099 A1 * | 8/2003 | Aoki et al. .................... 361/683 |
| 2003/0181202 A1 | 9/2003 | Link, III et al. |
| 2003/0224795 A1 * | 12/2003 | Wilhoite et al. ............... 455/445 |
| 2004/0018774 A1 | 1/2004 | Long et al. |
| 2004/0032484 A1 | 2/2004 | Halttunen |
| 2004/0066776 A1 | 4/2004 | Ishidoshiro |
| 2004/0072544 A1 | 4/2004 | Alexis |
| 2004/0072593 A1 * | 4/2004 | Robbins et al. ............... 455/560 |
| 2004/0116073 A1 | 6/2004 | Mauney et al. |
| 2004/0120492 A1 | 6/2004 | Lew et al. |
| 2004/0127241 A1 | 7/2004 | Shostak |
| 2004/0156491 A1 | 8/2004 | Reding et al. |
| 2004/0203374 A1 | 10/2004 | Zilliacus |
| 2004/0204056 A1 | 10/2004 | Phelps, III |
| 2004/0208297 A1 * | 10/2004 | Valentine ................... 379/88.19 |
| 2004/0213212 A1 | 10/2004 | Reding et al. |
| 2004/0266425 A1 | 12/2004 | Gonsalves et al. |
| 2005/0020236 A1 | 1/2005 | Mauney et al. |
| 2005/0032475 A1 | 2/2005 | Mauney et al. |
| 2005/0054335 A1 | 3/2005 | Pearson et al. |
| 2005/0063360 A1 | 3/2005 | Lowmaster |
| 2005/0063528 A1 | 3/2005 | Pearson et al. |
| 2005/0064853 A1 | 3/2005 | Radpour |
| 2005/0064855 A1 | 3/2005 | Russell |
| 2005/0096024 A1 | 5/2005 | Bicker et al. |
| 2005/0210101 A1 | 9/2005 | Janik |
| 2005/0273781 A1 | 12/2005 | Nakamura et al. |
| 2005/0277431 A1 | 12/2005 | White |
| 2005/0282582 A1 | 12/2005 | Slotznick |
| 2006/0003806 A1 | 1/2006 | Weber et al. |
| 2006/0031587 A1 | 2/2006 | Paterson et al. |
| 2006/0136546 A1 * | 6/2006 | Trioano et al. ................. 709/203 |

FOREIGN PATENT DOCUMENTS

| | | |
|---|---|---|
| GB | 2 305078 | 3/1997 |
| JP | 8-163646 | 6/1996 |
| JP | 8-172673 | 7/1996 |
| JP | 8-294168 | 11/1996 |
| JP | 8-294170 | 11/1996 |
| JP | 8-317468 | 11/1996 |
| JP | 8-322087 | 12/1996 |
| JP | 9-37345 | 2/1997 |
| JP | 9-55981 | 2/1997 |
| JP | 9-84117 | 3/1997 |
| JP | 9-98476 | 4/1997 |
| WO | WO 94/05101 | 3/1994 |

OTHER PUBLICATIONS

Zbar, Jeff "Follow-me phone service keeps remote worker tethered to clients, co-workers"; NetworkWorldFusion; www.nwfusion.com/net.worker/columnists/2002/0826zbar.html; 3 pages, May 16, 2003.

www.officescape.com/services.asp; Follow-me phone; 1 page, May 16, 2003.

Callagenix "call diversion service"; www.callagenix.com/services/diversion.html; 3 pages, May 16, 2003.

Gupta, Puneet, "Short Message Service: What, How and Where?"; Wireless Developer Network; www.wirelessdevnet.com/channels/sms/features/sms.html; 7 pages, Jul. 8, 2003.

Webopedia; "Short Message Service", www.webopedia.com/TERM/S/Short_Message_Service.html; 3 pages, Jul. 8, 2003.

"Cellular Phone and Roaming Service"; www.members.tripod.com/peacecraft/infomining/cellphon.htm; 19 pages, Jul. 8, 2003.

English Language Abstract of JP No. 9-98476.
English Language Abstract of JP No. 9-84117.
English Language Abstract of JP No. 9-55981.
English Language Abstract of JP No. 9-37345.
English Language Abstract of JP No. 8-322087.
English Language Abstract of JP No. 8-317468.
English Language Abstract of JP No. 8-294170.
English Language Abstract of JP No. 8-294168.
English Language Abstract of JP No. 8-172673.
English Language Abstract of JP No. 8-163646.

Bluetooth Consortium, "Specification of the Bluetooth System: Profiles"; Dec. 1, 1999.

Haartsen, J., "Bluetooth: A New Radio Interface Providing Ubiquitous Connectivity", IEEE, Dec. 2000, pp. 107-111.

Schneiderman, R., "Bluetooth's Slow Down", IEEE, Dec. 1999, pp. 61-65.

Charney, Ben; "VoIP Maker Plans Cell Hybrid"; http://zdnet.com, News Software; Oct. 3, 2003. pp. 1-3.

International Search Report and Written Opinion of the International Searching Authority for PCT/US04/34239; Feb. 17, 2005; 10 pages.

International Search Report and Written Opinion of the International Searching Authority for PCT/US05/16449; Apr. 10, 2006; 11 pages.

International Search Report and Written Opinion of the International Searching Authority for PCT/US04/16017; Aug. 16, 2005; 7 pages.

International Search Report and Written Opinion of the International Searching Authority for PCT/US04/28260 Sep. 30, 2005; 10 pages.

International Search Report and Written Opinion of the International Searching Authority for PCT/US2005/016449; Jun. 15, 2006; 3 pages.

* cited by examiner

TION BASED CALL ROUTING FOR
CALL ANSWERING SERVICES

FIELD OF THE DISCLOSURE

The present disclosure relates in general to location based routing and call answering.

BACKGROUND

In an increasingly mobile society, mobile telephones and telecommunications devices have become ubiquitous. Cell phones and other mobile telecommunications devices offer the ability to be in contact or reachable at all times. However, users of cell phones typically have more than one phone number at which they may be reached. For example, cellular telephone users may also have a landline phone number for their home or office.

In a typical situation, a caller may attempt one of several numbers in an attempt to reach an individual. For example, a caller may call a home number, then a cell number or office number. This added effort wastes time and telephony resources.

To save time many callers will call a cell phone or mobile telecommunications device number first. But, receiving a call on a cell phone is more expensive than receiving a phone call on the user's landline phone.

Some service providers have implemented a service in which different numbers provided by the user are attempted until the user answers. However, callers may become frustrated while waiting through several attempts to connect to the user through different numbers. As such, an improved method for managing phone calls would be desirable.

DESCRIPTION OF THE DRAWINGS

Figure 1:
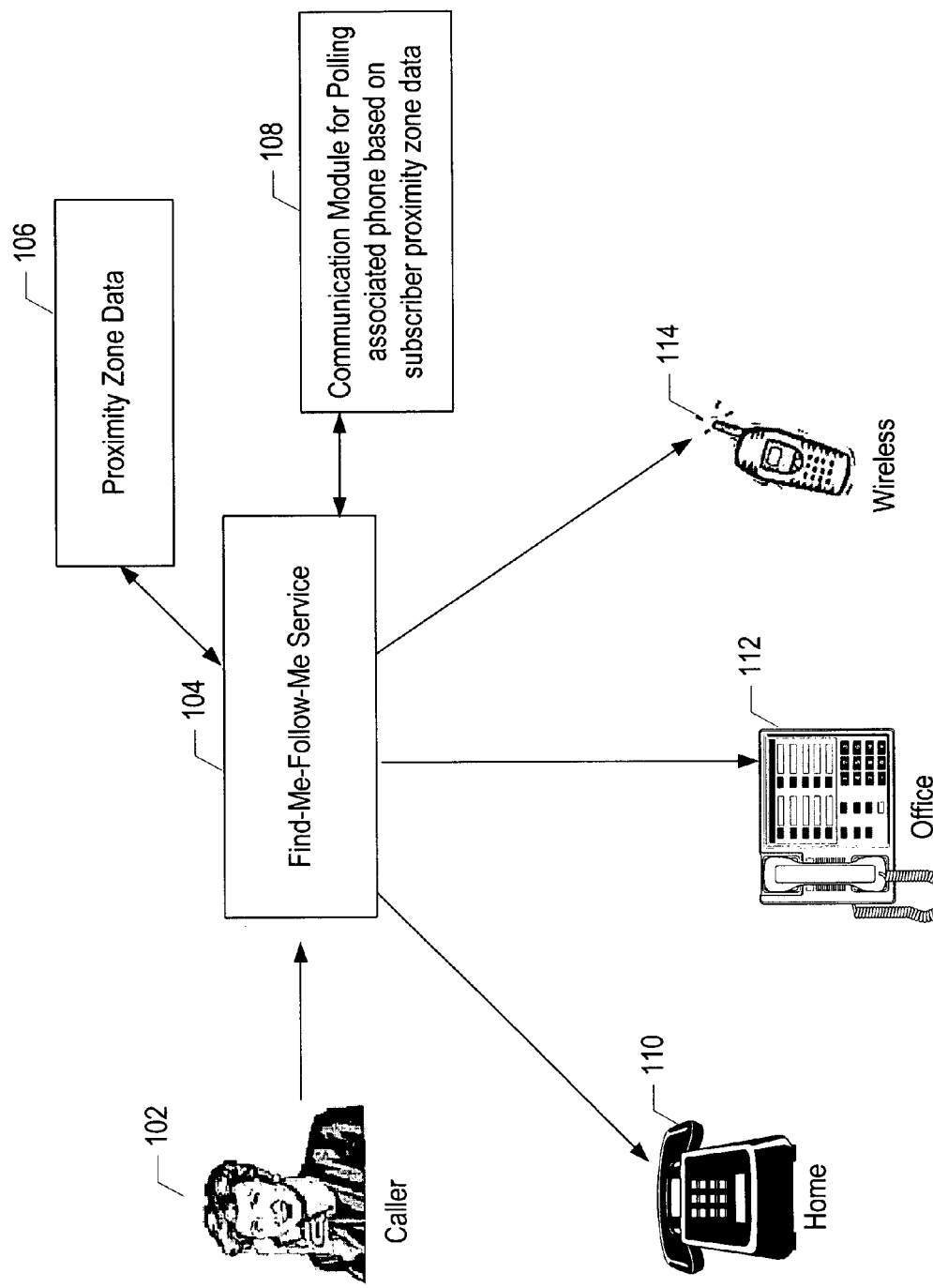
FIG. 1 depicts an exemplary calling service system.

Referring to FIG. 1, a particular illustrative embodiment of a location based call direction system is shown. The system includes a Find-Me-Follow-Me Service 104 responsive to callers including an illustrative caller 102. The system also includes a proximity zone database 106, and a communication module for polling communication devices based on proximity zone data 108. During operation, a call is received at the Find-Me-Follow-Me Service 104, which retrieves proximity zone data from the database 106. Based on the proximity zone data, the Find-Me-Follow-Me Service 104 communicates a message or sends a call to one of a plurality of available subscriber devices. The particular subscriber device first attempted is based on the proximity zone data. The communication module 108 may poll each of the subscriber devices in an order based upon the proximity zone data in an attempt to reach the subscriber. Examples of illustrative subscriber devices include a land-line phone 110, a work office phone 112, and a mobile device such as a cellular phone 114.

Figure 2:
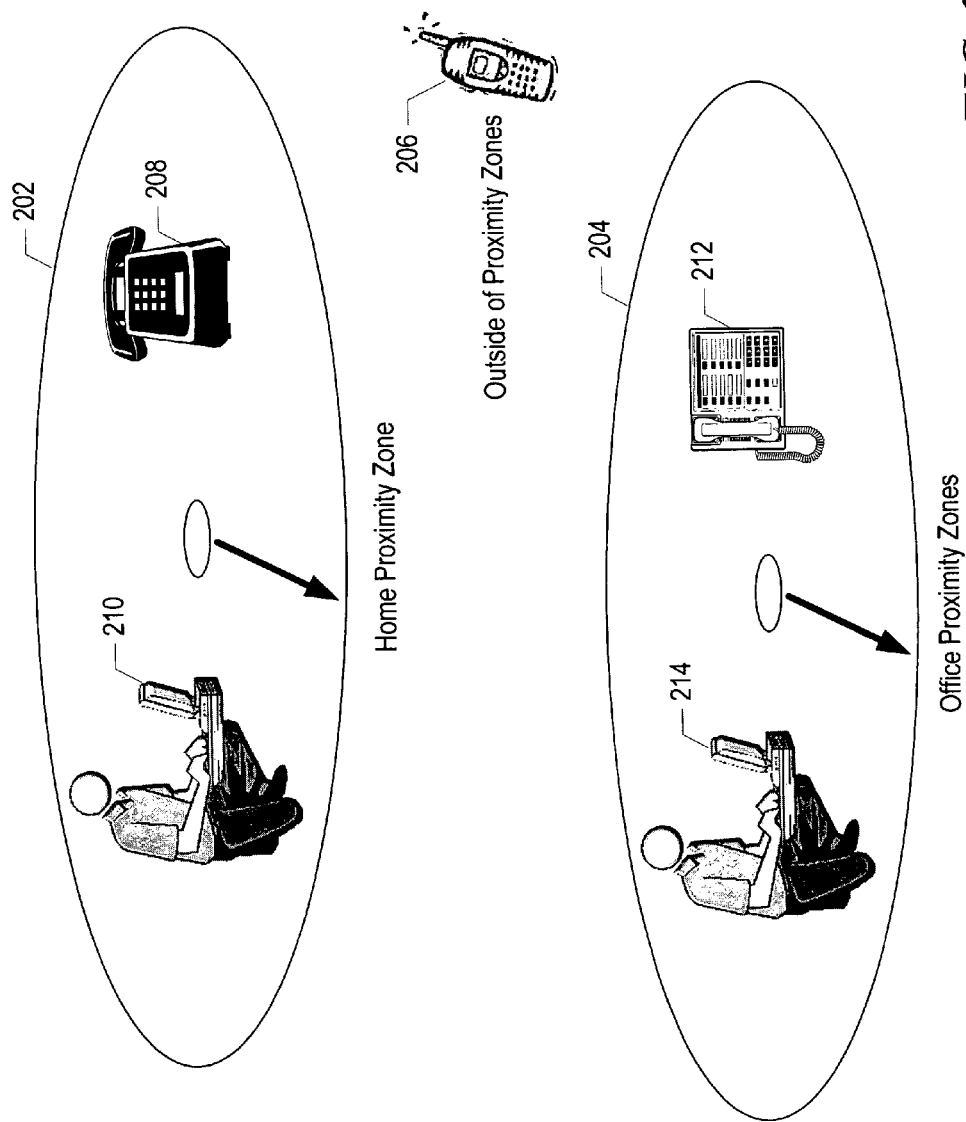
FIG. 2 depicts an exemplary proximity zones.

Referring to FIG. 2, an example of available proximity zones is shown. A home proximity zone 202 is shown as including a center zone point that provides coverage area and an illustrative subscriber device, such as a land-line phone 208 or a laptop personal computer 210. Similarly, an office proximity zone 204 is illustrated including subscriber devices 212 and 214. For the mobile device 206, a mobile proximity zone may be identified or no proximity zone may be indicated to define that the mobile device 206 is outside of the home proximity zone 202 and the office proximity zone 204.

Figure 3:
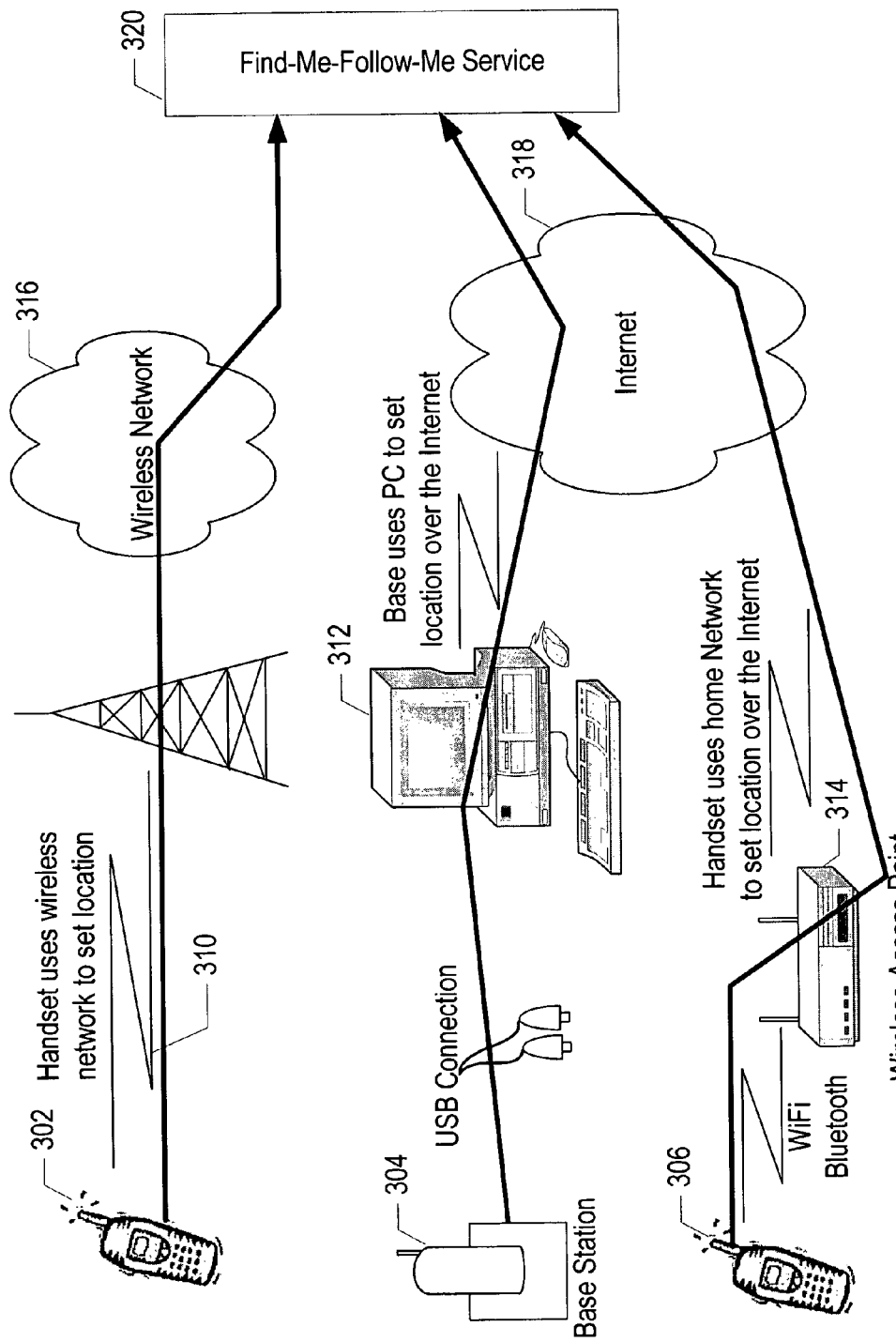
FIG. 3 illustrates exemplary embodiments of a calling service system.

Referring to FIG. 3, an illustrative system 300 for implementing routing of calls based on a subscriber location based on proximity zones is shown. The system 300 includes a wireless network 316 and a wire-line computer network 318. The wireless network 316 is coupled to various subscriber wireless devices, such as the mobile device 302. The wire-line network 318, such as the Internet, is coupled to various communication nodes such as a personal computer 312 and a wireless access point 314. The wireless access point 314 may be an 802.11 or Bluetooth type access point providing wireless data access coverage to mobile devices, such as device 306. The personal computer 312 may have a connection such as a USB connection to a cradle that charges and holds a communication device 304. In a particular illustrative embodiment, the mobile devices 302, 304, and 306 may be different devices or may be a common device that is configured to communicate with the various wireless and wire-line infrastructure interfaces. The wireless network 316 and the wire-line computer network 318 are also coupled to the Find-Me-Follow-Me Service 320. During operation of the system, location data may be retrieved from various mobile devices and passed to the Find-Me-Follow-Me Service 320. The Find-Me-Follow-Me Service may, via the wireless or wire-line networks 316 or 318, communicate with wire-line or wireless subscriber devices, such as devices 302, 304, and 306 for handling a call.

The subscriber wireless device is one example of a location indicator that may indicate proximity of a subscriber to a landline phone. Other examples of a location indicator include key fobs, smart card, RFID device, mobile telephones with built in wireless communication, and devices with contact points such as mobile phones or personal digital assistants (PDAs) with electrical contacts. Proximity may be indicated, for example, through contact with a charging unit or base station, communication with a beacon or wireless access point, global positioning circuitry, ultrasonic signaling, or infrared signaling. A module may determine if the location indicator indicates location of a subscriber within a zone associated with a subscriber communication device such as a landline telephone. The module may be implemented in the mobile subscriber device, in a device coupled to a distributed computer network, or in a device coupled to a public switch network.

Figure 4:
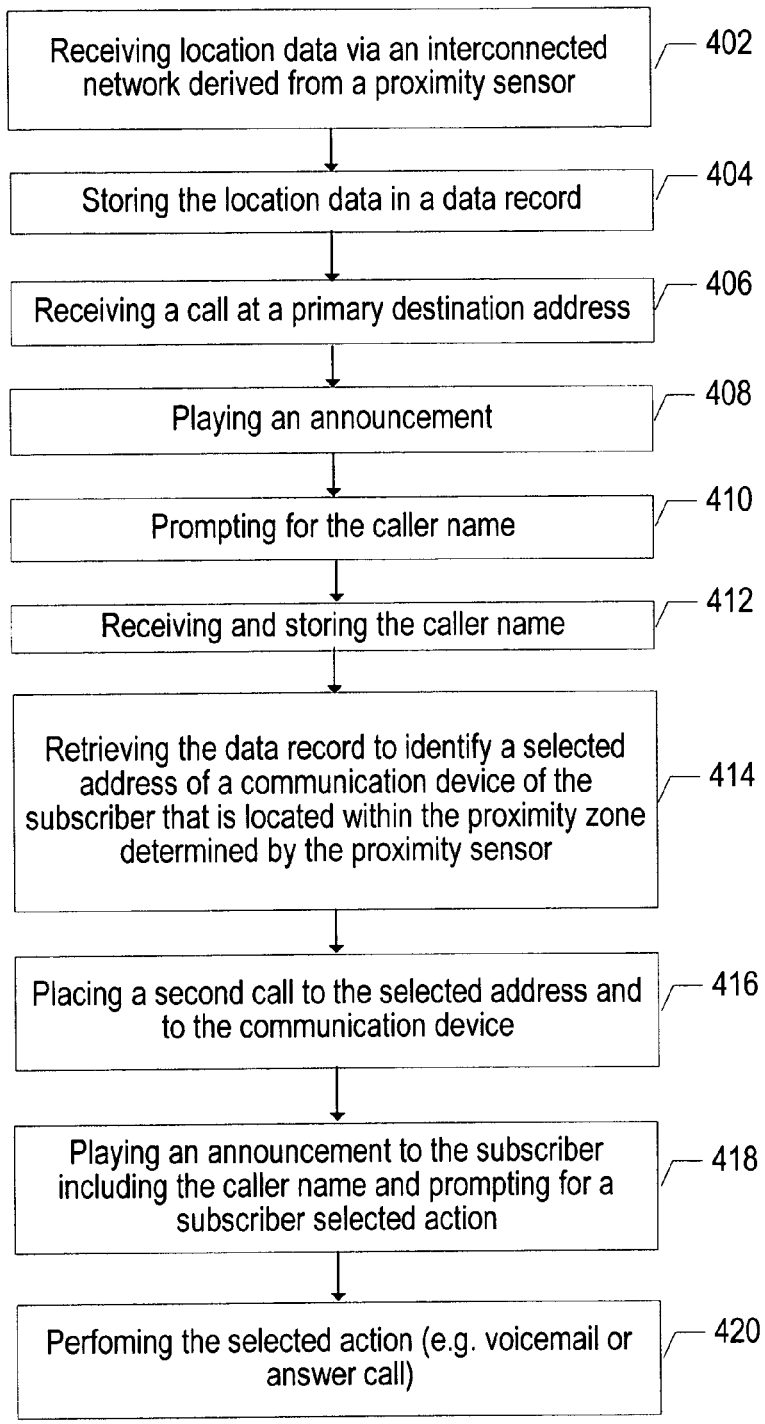
FIGS. 4 and 5 depicts an exemplary method of providing a calling service.

Referring to FIG. 4, a method of processing calls using a Find-Me-Follow-Me Service and location based routing is illustrated. Location data is received via an interconnected network, at step 402. The location data may be derived from a proximity sensor, such as a proximity sensor located near a particular subscriber mobile device. The location data retrieved is stored in a data record, at step 404. The data record may be located within a database that is accessible to a Find-Me-Follow-Me Service provider.

An incoming call is received at a primary destination address, at step 406. An example of a primary destination address is a phone number of a Find-Me-Follow-Me Service or a subscriber number for other call-routing services, such as a unified messaging system capable of handling fax, e-mail, voice, and voice-mail traffic. At step 408, an announcement is played to the incoming caller. The announcement may request the caller's name, at step 410, and advise the caller that the Find-Me-Follow-Me Service will locate the subscriber as requested by the caller. As a more particular example, the announcement may be "The subscriber you have called is not available right now. Please speak your name after the tone. I will attempt to locate them, or press 1 to go directly to voice-mail. <Beep>." At this point, the caller speaks their name and the system responds, such as, "Please hold while I locate the subscriber". At this point the system receives and stores the caller's name at step 412.

The data record is then retrieved to identify a selected address of a communication device of the subscriber that is located within the proximity zone as determined by the proximity sensor, at step 414. For example, a selected address may be a phone number of a mobile phone when the subscriber is determined to be outside of the home or the office proximity zones. As another example, the selected address may be the phone number for the subscribers' residence, when the subscriber is detected as being within the home proximity zone 202. As another example, the selected address may be a work phone number or an electronic address of a work e-mail when the subscriber is determined to be within the office proximity zone 204. At this point the system places a call to the selected address in an attempt to reach the communication device proximate of the subscriber at step 416.

Upon detecting an answer by the subscriber, the system plays an announcement to the subscriber that includes the caller's name and prompts for the subscriber's selected action, at step 418. An example of a selected action would be to route the caller to voice mail or to answer the call. The selected action is then performed by the system, at step 420. Where the selected action is to send the caller to voice mail, the system performs such action and initiates a call transfer from the originating caller to an associated voice mail system associated with the subscriber. However, where the call is accepted by the subscriber, then the call received by the service is bridged with the call placed to the subscriber, so that the caller may communicate with the subscriber and a conversation or other communication may then take place.

Figure 5:
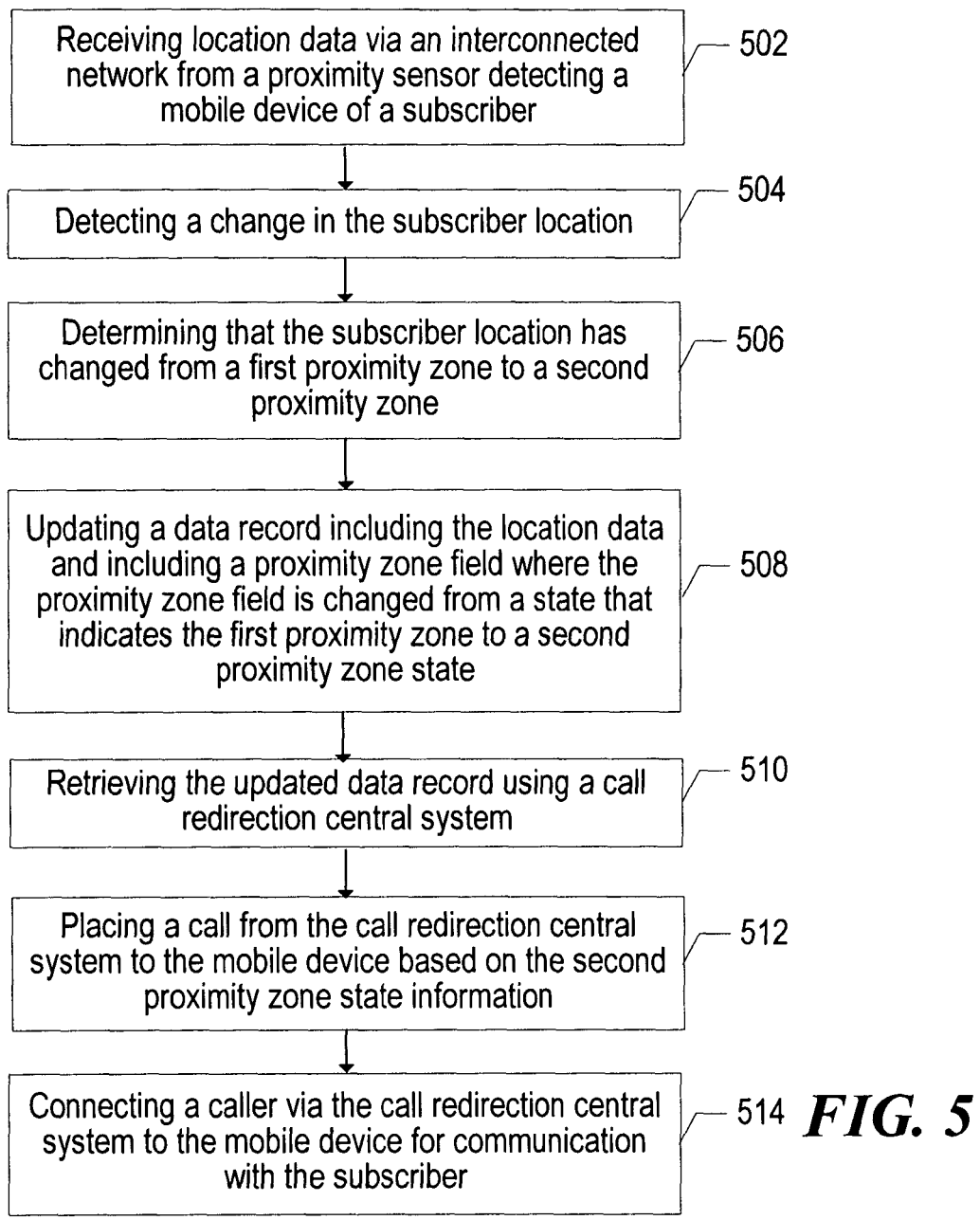

Referring to FIG. 5, a method of updating a proximity zone of a subscriber is illustrated. At step 502, location data is received via an interconnected network from a proximity sensor that detects a mobile device of the subscriber. A change in the subscriber proximity zone is detected, at steps 504 and 506. More specifically, the subscriber location is detected as being changed from a first proximity zone to a second proximity zone. For example, the first proximity zone may be the subscriber's home zone 202 and the second proximity zone may be a mobile proximity zone 206. A data record, including location data and including the proximity zone information is then updated, at step 508. For example, a proximity zone field may be included in the data record that would be changed from a first proximity zone state to a second proximity zone state. At step 510, the updated data record is retrieved by a call direction control system. An example of a call direction control system is a control system that provides the Find-Me-Follow-Me type of service. After the updated data record is retrieved by the system, a call is received at the call direction control system, at step 512. The call direction control system, upon detecting the incoming call, would place a second call to a mobile device associated with a subscriber at the second proximity zone. For example, where the second proximity zone is the wireless zone, the call could be directed to the subscriber's cell phone instead of to the subscriber's home or work phone. At step 514, a caller is then connected via the call redirection control system to the mobile device for communication with the subscriber.

For example, the caller to the Find-Me-Follow-Me Service may be connected to the subscriber at the subscriber's cell phone. While the method illustrated with respect to FIG. 5 describes a first and a second zone, it should be understood that the subscriber may be at one of a plurality of different zones and the work mobile, and home proximity zones are merely illustrative of particular proximity zone locations.

Figure 6:
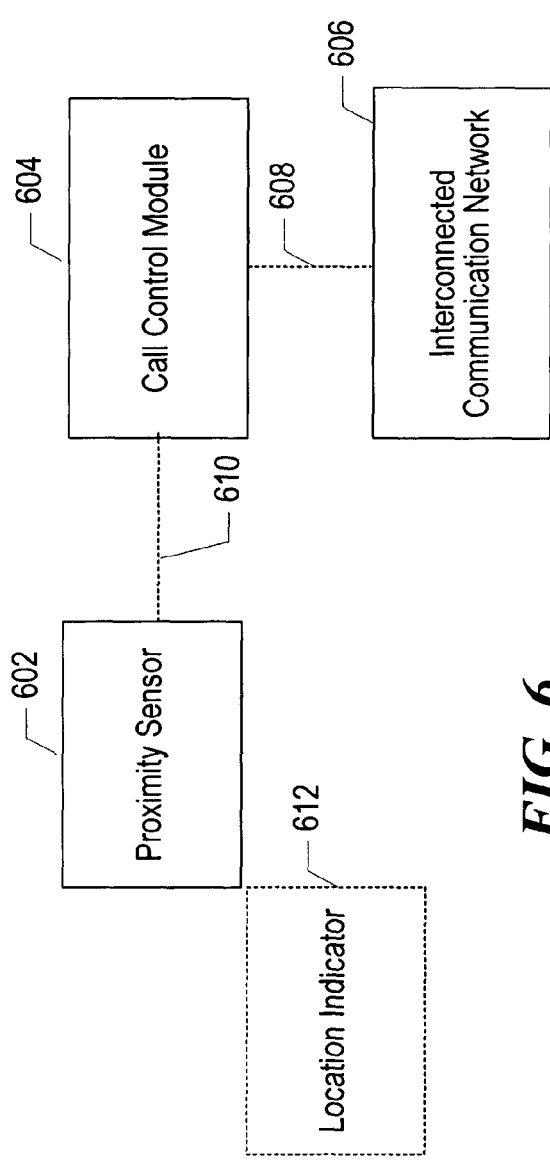
FIGS. 6, 7, and 8 illustrate exemplary embodiment of call management devices.

Referring to FIG. 6, an illustrative system to identify a proximity zone for a particular subscriber is shown. The system includes a location indicator 612, a proximity sensor 602, a call control module 604, and an interconnected communication network 606. The proximity sensor 602 is coupled to the call control module 604 via a first interface 610, and the call control module 604 is coupled to the interconnected communication network 606 via a second interface 608. The location indicator may be a circuit board or may be circuitry or software within an integrated circuit or other system that may be embedded within a variety of different types of communication devices. An example is a cellular phone, a pager, a smart-card, or a wearable device of a subscriber, such as an electronic wallet. The location indicator is intended to be carried by the subscriber so that the subscriber's location may be determined by the system. The proximity sensor 602 is configured to detect the presence or absence of the location indicator 612 within a proximity zone defined by a coverage area of the proximity sensor 602. An example of a proximity sensor includes a cradle, a wireless beacon, or other similar means of determining the presence or absence of the location indicator within a defined coverage area, such as a home proximity zone area. A call control module 604 may be implemented as software and/or hardware such as is typically found within a personal computer. The call control module 604 includes logic for updating data records and for providing location data in response to measurements detected and communicated from the proximity sensor 602, via the first interface 610. The call control module 604 may communicate call redirection messages, location data updates and proximity zones data via the communication network 606 and via the second interface 608. The interconnected communication network 606 may be a distributed computer network, such as the Internet; a wireless telephony network; a pager network; or a public switch telephone network (PSTN)

The redirection control message can be any application layer communications protocol including Remote Procedure Calls (RPC), InterProcess Communications (IPC) message, Simple Object Access Protocol (SOAP) message, email message, HyperText Transfer Protocol (HTTP) message, or file transfer protocol (FTP) message.

Figure 7:
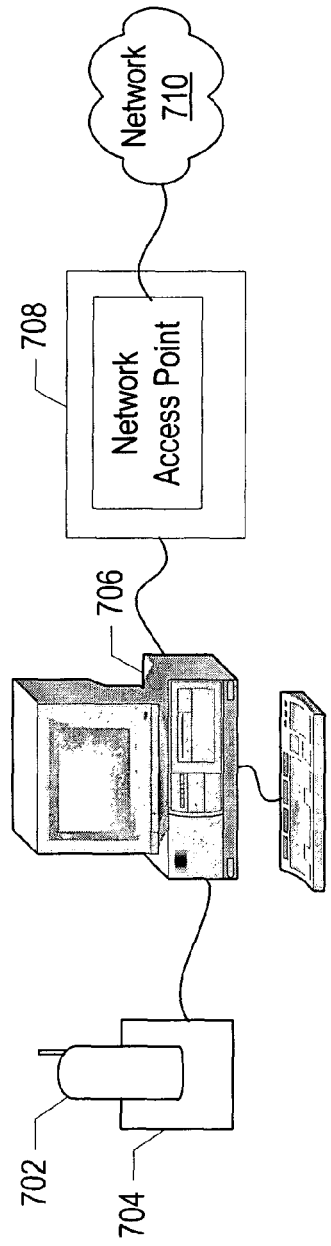

Referring to FIG. 7, another illustrative system for determining and communicating proximity information is shown. The system includes a cradle 704 housing a removable and mobile communication device 702. The cradle 704 is coupled to a personal computer 706. The computer 706 is connected to a network access point 708, such as a modem, broadband modem, router, or data network switch, which is coupled to the interconnected network 710. An example of the interconnected network is the Internet. The computer 706 includes a call redirection module that may perform functions similar to those described with respect to the call control module 604 and may be used to communicate location data, proximity germinations, and other messaging associated with the proximity system.

Figure 8:
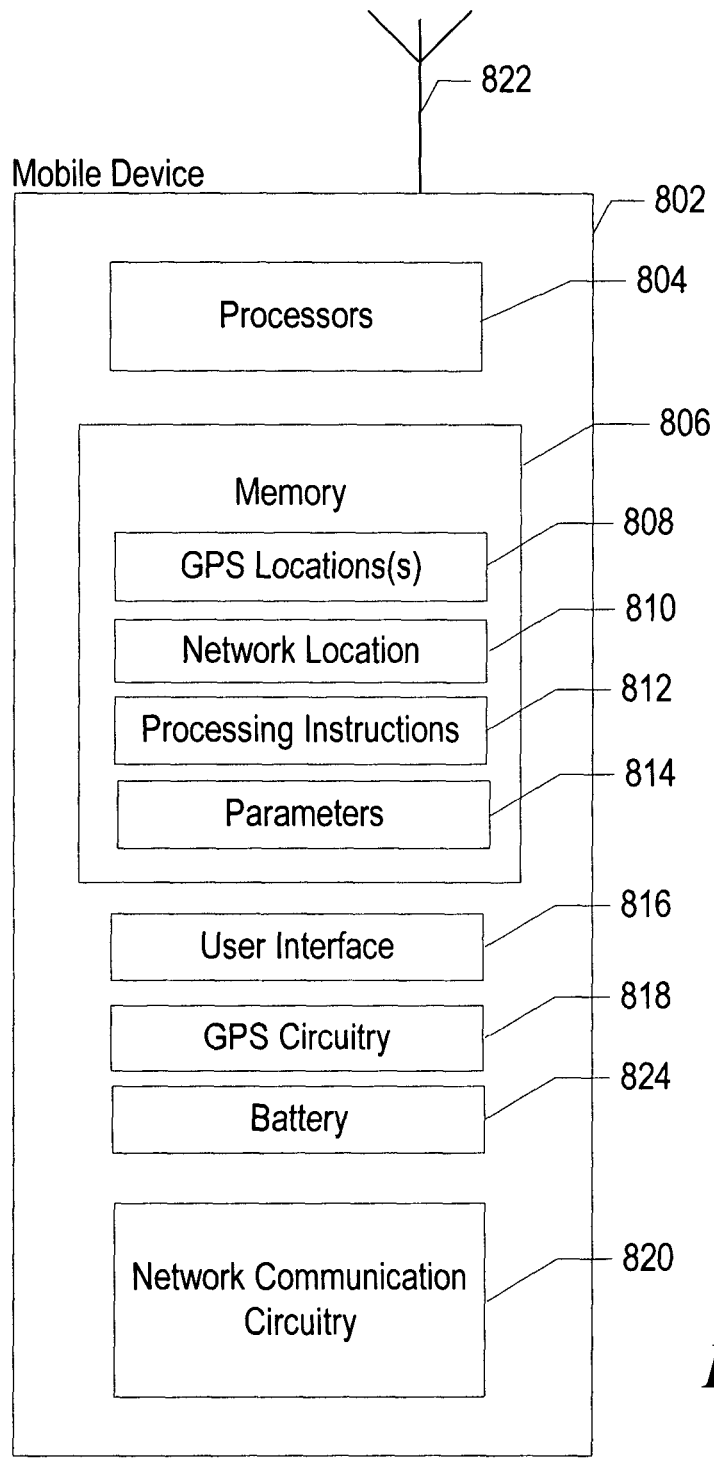

Referring to FIG. 8, an illustrative mobile communication device is shown. The mobile device includes a housing 802 and an antenna 822. The mobile device also includes a processor 804 and a memory 806. The memory 806 includes various data such as global positioning system (GPS) location data 808, network location data 810, processing instructions 812, and data parameters 814. The mobile device also includes a user interface 816, such as a display screen and keypad, GPS receiver circuitry 818, and a network communication circuitry module 820. The network communication circuitry may include an interface for connection to a proximity sensor, such as an electrical connection for establishing electrical contact upon insertion of the mobile device into a cradle. A battery 824 within the mobile device may be charged by an attached cradle via the electrical connection. The mobile device may included other communication circuitry for detecting or communicating the presence of the mobile device within a coverage area of a proximity sensor.

The illustrated system and method of providing a Find-Me-Follow-Me Service using retrievable proximity location data has several benefits. An example of such benefit is reduced delays for callers attempting to reach a subscriber to the service. Incoming calls that reach the Find-Me-Follow-Me Service may be quickly routed to the most likely subscriber phone based on the subscriber's current proximity zone information. By using the subscriber proximity information, the Find-Me-Follow-Me Service may intelligently attempt to locate the subscriber of a particular subscriber address, rather than perform a random search of all devices where the subscriber may be reached. In addition, while the disclosed system utilized localized proximity sensors to determine subscriber proximity, wide-area proximity sensors such as GPS or emergency 911 wireless services capabilities may alternately be utilized. In addition, unlicensed radio spectrum may also be used for providing communication and proximity determination between a mobile device and a proximity determination module within a base station. For example, when the handset is within a radio range of the base station, the handset is identified as being within the proximity zone associated with that base station. In addition, the radio may be replaced by other communication methods such as infrared or ultrasound.

In one particular embodiment, the disclosure is directed to a method of processing a call. The method includes receiving location data, storing the location data in a data record, receiving a first call, playing an announcement, prompting for a caller's name, receiving the caller's name, and retrieving the data record. The location data is received via an interconnected network. The location data is derived from a proximity sensor that is configured to provide a proximity determination with respect to a mobile device of a subscriber and the proximity sensor. The first call is received at a primary destination address associated with the subscriber. The data record is retrieved to identify a selected address that identifies a communication device of the subscriber. The communication device is located within a proximity zone proximate to the proximity sensor.

In another embodiment, the disclosure is directed to a method to update a proximity zone state. The method includes receiving location data, detecting a change in subscriber location based on the location data, determining a change from a first proximity zone state to a second proximity zone state based on the subscriber location, and updating a data record. The location data is received via an interconnected network and is derived from a proximity sensor. The proximity sensor is configured to provide a proximity determination with respect to a mobile device of a subscriber and the proximity sensor. The data record is updated utilizing the location data and is accessible to a call redirection control system. The data record includes a proximity zone field, the proximity zone field is changed from a first proximity zone state to a second proximity zone state.

In a further embodiment, the disclosure is directed to a system for manipulating call redirection. The system includes a proximity sensor, computational circuitry, and an interconnected network access point to a computer network. The proximity sensor is configured to determine whether a mobile device is proximate to the proximity sensor. The computational circuitry is coupled to the proximity sensor. The proximity sensor is configured to communicate data to the computation circuitry. The data is associated with a proximity determination with respect to the mobile device and the proximity sensor. The interconnected network access point is coupled to the computational circuitry to transmit a call redirection control message via the interconnected network access point in response to the proximity determination.

In one exemplary embodiment, the disclosure is directed to an apparatus for controlling data redirection. The apparatus includes a receiver configured to receive data signals associated with a mobile location indicator, computational logic configured to determine whether the mobile location indicator is proximate to the receiver based on the received data signals, and a network interface. The computational logic is configured to communicate a redirect message via the network interface in response to determining that the mobile location indicator is proximate to the receiver. The redirect message may initiate redirection of data initially to be sent to a first network address to be redirected to a second network address when the mobile location indicator is proximate to the receiver. The redirect message may cancel a previous redirection of data when the mobile location indicator is not proximate to the receiver. The mobile location indicator may be a wireless telephone and the data signals may be control signals transmitted on a control channel to a remote wireless network. The network interface may be configured to communicate with a wireless network. The network interface may be configured to communicate with a wired network.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for manipulating call redirection, the system comprising:
 a proximity zone database storing proximity zone data received from one or more of a mobile telephone of a subscriber and a computing device associated with the subscriber; and
 a call direction control system coupled to the proximity zone database to:
  receive a first call directed to a mobile telephone number of the mobile telephone of the subscriber;
  place a second call:
   to a telephone number of a telephone device within a proximity zone associated with the computing device when the proximity zone data in a call redirection message sent by the computing device indicates that the mobile telephone is in electrical contact with a charging device that is coupled to the computing device, wherein the computing device is external to the charging device and is coupled to a network via a network access point;

to the telephone number of the telephone device when the proximity zone data from the mobile telephone indicates that the mobile telephone is in wireless communication with a wireless network access point within the first proximity zone; and to the mobile telephone number of the mobile telephone of the subscriber when the proximity zone data in the call redirection message indicates that the mobile telephone is no longer in electrical contact with the charging device that is coupled to the computing device; and after the subscriber answers the second call, prompt the subscriber with a plurality of options comprising:

a first option to answer the first call; and a second option to route the first call to voice mail.

2. The system of claim 1, wherein the proximity zone is a home proximity zone associated with a home of the subscriber or a work proximity zone associated with a work place of the subscriber.

3. The system of claim 1, wherein the call direction control system, in response to a selection of the second option, routes the first call to voice mail.

4. The system of claim 1, wherein the call direction control system, in response to a selection of the first option, bridges the first call and the second call.

5. The system of claim 1, wherein, after receiving the first call, the call direction control system prompts a caller to provide the caller's name and stores a data record including the caller's name.

6. The system of claim 5, wherein, after placing the second call, the call direction control system accesses the data record including the caller's name and plays an announcement to the subscriber that includes the caller's name before prompting the subscriber to select with the plurality of options.

7. The system of claim 1, wherein the wireless network access point is an 802.11 wireless network access point that is coupled to the computing device.

8. The system of claim 1, wherein the wireless network access point is a Bluetooth access point that is coupled to the computing device.

9. A method of processing a call, the method comprising:

determining proximity zone data of a subscriber based on a call redirection message received from one of a plurality of computing devices associated with the subscriber;

storing the proximity zone data;

redirecting a first call directed to a mobile telephone number of a mobile telephone associated with the subscriber based on the call redirection message, wherein redirecting the first call includes placing a second call to:

a first telephone number of a first telephone device within a first proximity zone associated with a first computing device of the subscriber when the call redirection message is received from the first computing device and indicates that the mobile telephone is in electrical contact with a first charging device that is coupled to the first computing device, wherein the first computing device is external to the first charging device and is coupled to a first network via a first network access point; and a second telephone number of a second telephone device within a second proximity zone associated with a second computing device of the subscriber when the call redirection message is received from the second computing device and indicates that the mobile telephone is in electrical contact with a second charging device that is coupled to the second computing device, wherein the second computing device is external to the second charging device and coupled to a second network via a second network access point; and after the subscriber answers the second call, prompting the subscriber with a plurality of options comprising:

a first option to answer the first call; and a second option to route the first call to voice mail.

10. The method of claim 9, wherein the call redirection message uses an application layer communication protocol.

11. The method of claim 9, wherein the call redirection message comprises a Remote Procedure Call.

12. The method of claim 9, wherein the call redirection message comprises an InterProcess Communications message.

13. The method of claim 9, wherein the call redirection message comprises a Simple Object Access Protocol message.

14. The method of claim 9, wherein the call redirection message comprises an electronic mail message.

15. The method of claim 9, wherein the call redirection message comprises a HyperText Transfer Protocol message.

16. The method of claim 9, wherein the call redirection message comprises a file transfer protocol message.

17. A method, comprising:

at a computing device associated with a subscriber, detecting that a mobile telephone associated with the subscriber is in electrical contact with a charging device coupled to the computing device, wherein the computing device is external to the charging device, wherein the computing device is coupled to the charging device via a universal serial bus connection, and wherein the computing device is coupled to a network via a network access point;

sending a first call redirection message from the computing device to a call redirection service, wherein the first call redirection message indicates that a first call directed to a mobile telephone number of the mobile telephone is to be redirected by placing a second call to a telephone number of a telephone device within a proximity zone associated with the computing device;

after the subscriber answers the second call, prompting the subscriber with a plurality of options comprising:

a first option to answer the first call; and a second option to route the first call to voice mail;

detecting that the mobile telephone is no longer in electrical contact with the charging device coupled to the computing device; and sending a second call redirection message from the computing device to the call redirection service, wherein the second call redirection message cancels the redirection of calls to the telephone number.

* * * * *

UNITED STATES PATENT AND TRADEMARK OFFICE
CERTIFICATE OF CORRECTION

PATENT NO.         : 8,526,977 B2                         Page 1 of 1
APPLICATION NO.    : 10/668686
DATED              : September 3, 2013
INVENTOR(S)        : Larry B. Pearson et al.

It is certified that error appears in the above-identified patent and that said Letters Patent is hereby corrected as shown below:

In the Claims
Column 7, Claim 6, Line 36, "the subscriber to select with the plurality of options." should read --the subscriber with the plurality of options.--.

Signed and Sealed this
Fourth Day of March, 2014

Michelle K. Lee
*Deputy Director of the United States Patent and Trademark Office*